United States Patent
Hu et al.

(10) Patent No.: US 10,746,527 B2
(45) Date of Patent: Aug. 18, 2020

(54) METHOD AND SYSTEM FOR DETECTING BEND IN ROTATING SHAFT OF MAGNETIC BEARING

(71) Applicant: Gree Electric Appliances, Inc. of Zhuhai, Zhuhai, Guangdong (CN)

(72) Inventors: Yusheng Hu, Zhuhai (CN); Weilin Guo, Zhuhai (CN); Daofu Hu, Zhuhai (CN); Yongling He, Zhuhai (CN); Bin Yang, Zhuhai (CN)

(73) Assignee: GREE ELECTRIC APPLIANCES, INC. OF ZHUHAI, Zhuhai, Guangdong (CN)

( * ) Notice: Subject to any disclaimer, the term of this patent is extended or adjusted under 35 U.S.C. 154(b) by 260 days.

(21) Appl. No.: 15/778,526

(22) PCT Filed: Sep. 20, 2016

(86) PCT No.: PCT/CN2016/099472
§ 371 (c)(1),
(2) Date: May 23, 2018

(87) PCT Pub. No.: WO2017/088569
PCT Pub. Date: Jun. 1, 2017

(65) Prior Publication Data
US 2018/0356202 A1 Dec. 13, 2018

(30) Foreign Application Priority Data
Nov. 27, 2015 (CN) .......................... 2015 1 0856407

(51) Int. Cl.
*G01B 7/31* (2006.01)
*G01B 7/28* (2006.01)
(Continued)

(52) U.S. Cl.
CPC ............... *G01B 7/31* (2013.01); *G01B 7/282* (2013.01); *G01B 7/312* (2013.01); *G01M 13/04* (2013.01)

(58) Field of Classification Search
CPC .......... G01B 7/282; G01B 7/31; G01B 7/312; G01M 13/04
(Continued)

(56) References Cited

U.S. PATENT DOCUMENTS

2010/0122592 A1 5/2010 Kim et al.
2016/0139083 A1* 5/2016 Castane Selga ......... G01D 5/02
73/579

FOREIGN PATENT DOCUMENTS

CN 1453559 11/2003
CN 101424512 5/2009
(Continued)

*Primary Examiner* — Melissa J Koval
*Assistant Examiner* — Rahul Maini
(74) *Attorney, Agent, or Firm* — Brandon V. Zuniga; James R. Gourley; Carstens & Cahoon, LLP

(57) ABSTRACT

Provided are a method and a system for detecting bend in the rotating shaft of magnetic bearing. The system comprises a first displacement sensor, a second displacement sensor, and a processor electrically connected with the first displacement sensor and the second displacement sensor; the processor comprises a calculating unit, a first judging unit and a second judging unit; the calculating unit is configured to calculate center positions of the rotating shaft stopping at different positions during rotating a circle; the first judging unit judges whether the rotating shaft is bent or not according to a curve of the changed center positions, and outputs a test result of qualification if the rotating shaft is not bent. Users are able to determine whether the rotating shaft needs to be (Continued)

processed or not, to avoid causing destructive effects on the magnetic bearing system due to excessive bend degree of the rotating shaft.

9 Claims, 3 Drawing Sheets

(51) Int. Cl.
    *G01B 7/312*     (2006.01)
    *G01M 13/04*     (2019.01)

(58) Field of Classification Search
    USPC .................................................. 324/207.22
    See application file for complete search history.

(56) References Cited

FOREIGN PATENT DOCUMENTS

| | | |
|---|---|---|
| CN | 203224222 | 10/2013 |
| CN | 105258634 | 1/2016 |
| JP | H1151050 | 2/1999 |

\* cited by examiner

METHOD AND SYSTEM FOR DETECTING BEND IN ROTATING SHAFT OF MAGNETIC BEARING

CROSS REFERENCE TO RELATED APPLICATIONS

This application is a continuation application of PCT Patent Application No. PCT/CN2016/099472, entitled "Method and System for Detecting Bend in Rotating Shaft of Magnetic Bearing", filed on Sep. 20, 2016, which claims priority to Chinese Patent Application No. 201510856407.9, entitled "Method and System for Detecting Bend in Rotating Shaft of Magnetic Bearing", filed on Nov. 27, 2015, the entire contents of which are incorporated herein by reference.

TECHNICAL FIELD

The present disclosure relates to the technical field of magnetic levitation, and more specifically, to a method and a system for detecting bend in the rotating shaft of magnetic bearing.

BACKGROUND

Magnetic bearing, also known as electromagnetic bearing or magnetically forced bearing, is a new type of high-performance bearing that supports the rotating shaft using magnetic levitation without mechanical friction or lubrication. As a novel supporting component, magnetic bearing is another revolutionary change in the bearing industry following oil lubrication and gas lubrication, and it has been hailed as one of the most promising new technologies in the $21^{st}$ century.

In the existing magnetic bearing system, the rotating shaft is supported by the magnetic bearing and works in a state without oil lubrication or mechanical friction, so as to operate at a very high rotation speed. Since the rotating shaft comprises many components, the rotating shaft cannot be processed as a whole, which may result in bend of the rotating shaft. The bend degree may not be very large, but for a high-speed rotor, as the rotation speed becomes higher and higher, the rotating shaft will swing more and more seriously, eventually leading to instability of the rotor and causing destructive effects on the magnetic bearing system.

SUMMARY OF THE INVENTION

In view of this, the present disclosure provides a method and a system for detecting bend in the rotating shaft of magnetic bearing to detect bend degree of the rotating shaft, thereby avoiding causing destructive effects on the magnetic bearing system due to excessive bend degree of the rotating shaft.

To achieve the above objectives, the present disclosure provides the following technical schemes:

A system for detecting bend in a rotating shaft of magnetic bearing comprises at least one first displacement sensor disposed on one side of the rotating shaft, at least one second displacement sensor disposed on an opposite side of the rotating shaft, and a processor electrically connected with the first displacement sensor and the second displacement sensor;

the first displacement sensor is configured to measure a relative displacement between the rotating shaft and the first displacement sensor;

the second displacement sensor is configured to measure a relative displacement between the rotating shaft and the second displacement sensor;

the processor comprises a calculating unit, a first judging unit and a second judging unit; the calculating unit is configured to calculate center positions of the rotating shaft stopping at different positions during rotating a circle;

the first judging unit is configured to judge whether the rotating shaft is bent or not according to a curve of changed center positions, output a test result of qualification if the rotating shaft is not bent, and send an instruction to the second judging unit if the rotating shaft is bent;

the second judging unit is configured to, after receiving the instruction judge whether a difference between a maximum value and a minimum value of the center positions is less than a threshold value; output a test result of qualification of the rotating shaft if yes, output a test result of disqualification of the rotating shaft if the difference is greater than the threshold value.

Preferably, when the rotating shaft stops at a position during rotating a circle, the rotating shaft is moved to a position of the first displacement sensor by the magnetic bearing, so that the first displacement sensor generates a minimum value of a displacement signal and transmits the minimum value of the displacement signal to the calculating unit of the processor; then, the rotating shaft is moved by the magnetic bearing from the position of the first displacement sensor to a position of the second displacement sensor, so that the first displacement sensor generates a maximum value of a displacement signal and transmits the maximum value of the displacement signal to the calculating unit; the calculating unit calculates the center position of the rotating shaft according to the maximum value and the minimum value of the displacement signal.

Preferably, the first judging unit judges whether the rotating shaft is bent or not through judging whether the curve of the changed center positions is a straight line or not. If the curve of the changed center positions is a straight line, then the rotating shaft is not bent. If the curve of the changed center positions is not a straight line, then the rotating shaft is bent.

Preferably, the first judging unit judges whether the rotating shaft is bent or not through judging whether the curve of the changed center positions is a sine curve or not. If the curve of the changed center positions is a sine curve, then the rotating shaft is bent. If the curve of the changed center positions is not a sine curve, then the rotating shaft is not bent.

Preferably, the first displacement sensor and the second displacement sensor are eddy current displacement sensors.

A method for detecting bend in the rotating shaft of magnetic bearing is applied to any one of the systems for detecting bend in the rotating shaft of magnetic bearing described above. The detecting method comprises following steps:

calculating center positions of the rotating shaft stopping at different positions during rotating a circle;

judging whether the rotating shaft is bent or not according to the curve of the changed center positions;

if the rotating shaft is bent, judging whether the difference between the maximum value and the minimum value of the center positions is less than the threshold or not, if yes, determining that the rotating shaft is qualified, if not, then determining that the rotating shaft is unqualified.

Preferably, the step of calculating the center positions of the rotating shaft stopping at different positions during rotating a circle comprises following steps:

during rotating a circle of the rotating shaft, when the rotating shaft stops, moving the rotating shaft to a position of the first displacement sensor, to obtain the minimum value of the displacement signal;

moving the rotating shaft from the position of the first displacement sensor to a position of the second displacement sensor, to obtain the maximum value of the displacement signal;

calculating the center position of the rotating shaft according to the maximum value of the displacement signal and the minimum value of the displacement signal.

Preferably, the step of judging whether the rotating shaft is bent or not according to the curve of the changed center positions comprises:

judging whether the curve is a straight line or not; if yes, then the rotating shaft is not bent; if not, the rotating shaft is bent.

Preferably, the process of judging whether the rotating shaft is bent or not according to the curve of the changed center positions comprises:

judging whether the curve is a sine curve; if yes, the rotating shaft is bent; if not, the rotating shaft is not bent.

Compared with the prior art, the technical schemes provided by the present disclosure have following advantages:

The method and the system for detecting bend in the rotating shaft of magnetic bearing provided by the present disclosure, judge whether the rotating shaft is bent, and whether the rotating shaft is qualified through calculating the center positions of the rotating shaft stopping at different positions during rotating a circle. If the rotating shaft is qualified, the bend degree of the rotating shaft is within the allowable range; if the rotating shaft is unqualified, the bend degree of the rotating shaft is excessive, which may cause destructive effects on the magnetic bearing system. In this way, users are able to determine whether the rotating shaft needs to be processed or not based on the test result of the rotating shaft, so as to avoid causing destructive effects on the magnetic bearing system due to excessive bend degree of the rotating shaft.

BRIEF DESCRIPTION OF THE DRAWINGS

In order to describe the embodiments of the present disclosure or the technical schemes of the prior art more clearly, the present disclosure will be described briefly with reference to the figures used in describing the embodiments or the prior art. The figures described hereafter are merely some embodiments to explain the present invention. For those skilled in the art, other figures can be obtained according to the figures provided hereafter without any creative work.

DETAILED DESCRIPTION OF THE PREFERRED EMBODIMENTS

The technical schemes of the present invention will be described clearly and in more details with reference to the accompanying figures. Obviously, what described below are several but not all embodiments of the present invention. For those skilled in the art, other embodiments obtained based on the embodiments of the present disclosure without creative work are within the scope of the present invention.

In one of the embodiments, the present disclosure provides a system for detecting bend in the rotating shaft of magnetic bearing. The rotating shaft of the magnetic bearing is supported by a magnetic bearing. The rotating shaft is able to work in a high-speed running state without oil lubrication and mechanical friction. The rotating shaft of the present invention may be but not limited to a rotating shaft of a motor, or a rotating shaft of an engine and so on.

In one of the embodiments, the present disclosure provides a system for detecting bend in the rotating shaft of magnetic bearing. The system comprises at least one first displacement sensor disposed on one side of the rotating shaft, and at least one second displacement sensor disposed on an opposite side of the rotating shaft, and a processor electrically connected with the first displacement sensor and the second displacement sensor.

Wherein, the first displacement sensor is configured to measure the relative displacement between the rotating shaft and the first displacement sensor; the second displacement sensor is configured to measure the relative displacement between the rotating shaft and the second displacement sensor; the processor comprises a calculating unit, a first judging unit and a second judging unit; the calculating unit is configured to calculate center positions of the rotating shaft stopping at different positions during rotating a circle; the first judging unit judges whether the rotating shaft is bent or not according to the curve of the changed center positions; outputs a test result of qualification if the rotating shaft is not bent; sends an instruction to the second judging unit if the rotating shaft is bent; after receiving the instruction, the second judging unit judges whether the difference between a maximum value and a minimum value of the center positions is less than a threshold value; if yes, outputs a test result of qualification of the rotating shaft; if not, outputs a test result of disqualification of the rotating shaft.

Figure 1:
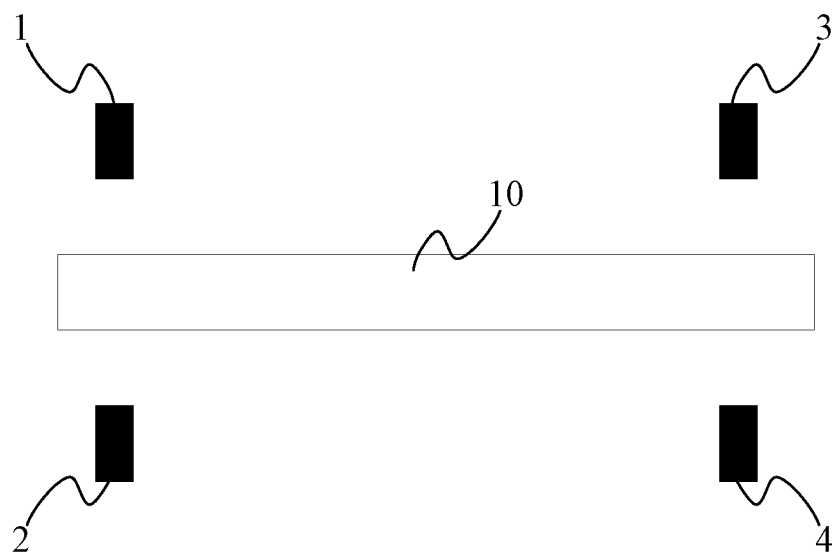
FIG. 1 is a schematic structural view of an unbent rotating shaft according to the first embodiment of the present disclosure.
Figure 2:
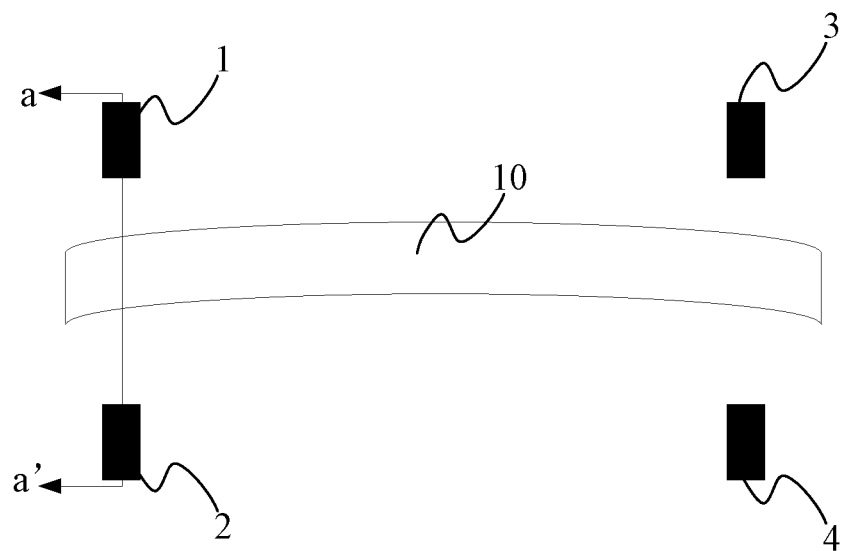
FIG. 2 is a schematic structural view of a bent rotating shaft according to the second embodiment of the present disclosure.

FIG. 1 is a schematic structural view of an unbent rotating shaft, and FIG. 2 is a schematic structural view of a bent rotating shaft. As shown in FIGS. 1 and 2, a sensor 1 and a sensor 3 are disposed on one side such as an upper side of a rotating shaft 10, and a sensor 2 and a sensor 4 are disposed on the opposite side such as a lower side of the rotating shaft 10. Wherein, the sensor 1 and the sensor 2 are provided symmetrically; the sensor 3 and the sensor 4 are disposed symmetrically; and the sensor 1 and the sensor 3 are the first displacement sensors; the sensor 2 and the sensor 4 are the second displacement sensors. Of course, in other embodiments of the present disclosure, it may be that only the sensor 1 and the sensor 2 are provided.

The working processes of the first displacement sensor and the second displacement sensor will be described as follows taking only the sensor 1 and the sensor 2 as examples. The working processes of the sensor 3 and the sensor 4 are the same as those of the sensor 1 and the sensor 2 respectively, and will not be repeated hereafter.

In this embodiment, the sensor 1 and the sensor 2 are preferably eddy current displacement sensors, and of course, they may be strain-type or inductive displacement sensors. Wherein, the eddy current displacement sensor can accurately measure changes of the static and dynamic relative displacements between a measured metal object and a probe end surface. That is to say, the sensor 1 may measure the relative displacement between the rotating shaft 10 and the probe of the sensor 1, and the sensor 2 may measure the relative displacement between the shaft 10 and the probe of sensor 2; and the displacement signals output from the sensor 1 and the sensor 2 vary with the distance between the corresponding probe and the rotating shaft 10. Therefore, when the rotating shaft 10 is located at the position of the sensor 1, the distance between the rotating shaft 10 and the sensor 1 is the smallest, at this moment, the sensor 1 outputs a minimum value of the displacement signal. When the rotating shaft 10 is located at the position of the sensor 2, the distance between the rotating shaft 10 and the sensor 1 is the largest, at this moment, the sensor 1 outputs a maximum value of the displacement signal.

Figure 3:
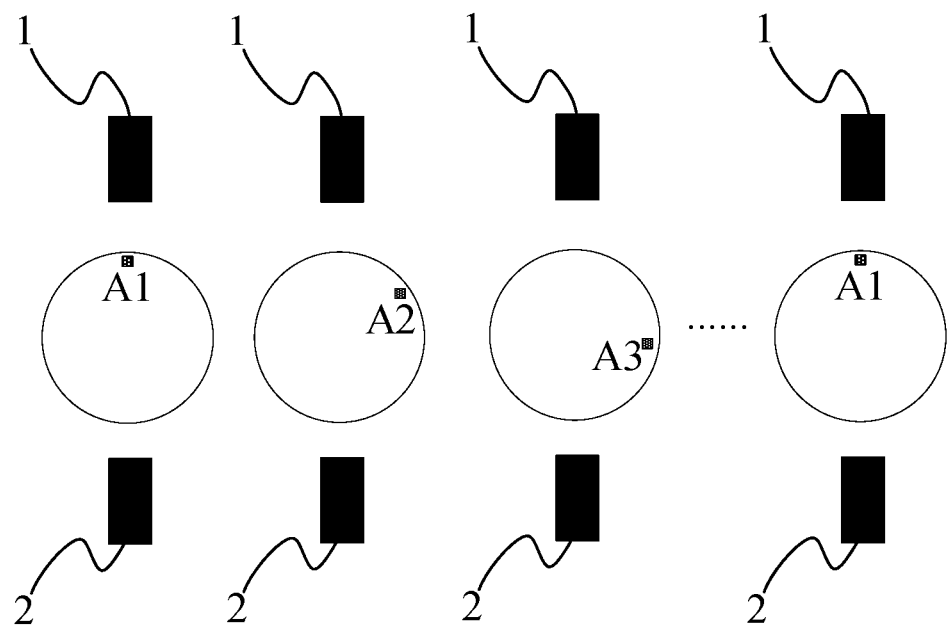
FIG. 3 illustrates schematic structural views of a rotating shaft stopping at different positions according to the third embodiment of the present disclosure.

Based on this, in this embodiment, the system for detecting bend in the rotating shaft of magnetic bearing controls the rotation of the rotating shaft 10 at first, to control the rotating shaft 10 to stop at different positions during the rotating shaft 10 rotating a circle. As shown in FIG. 3, a mark A on the rotating shaft 10 is taken as a reference. When the rotating shaft 10 begins to rotate, the mark A is located at the position indicated by A1; when the rotating shaft 10 stops for the first time, the mark A is located at the position indicated by A2; and when the rotating shaft 10 stops for the second time, the mark A is located at the position indicated by A3, and so on. Till the mark A returns to the position indicated by A1, the rotation shaft 10 completes rotating a circle.

In this embodiment, the center position of the rotating shaft 10 is measured each time the rotating shaft 10 stops. If the rotating shaft 10 is not bent, the center position of the rotating shaft is unique and constant; if the rotating shaft 10 is bent, the center positions will deflect upward or downward, and what's more, when the rotating shaft 10 rotates to different positions, the deflections of the center positions are different too. Based on this, in this embodiment, through measuring the center positions of the rotating shaft 10 stopping at different positions, the rotating shaft 10 is judged to be bent or not. Optionally, intervals between each two adjacent stop positions are equal.

Figure 4:
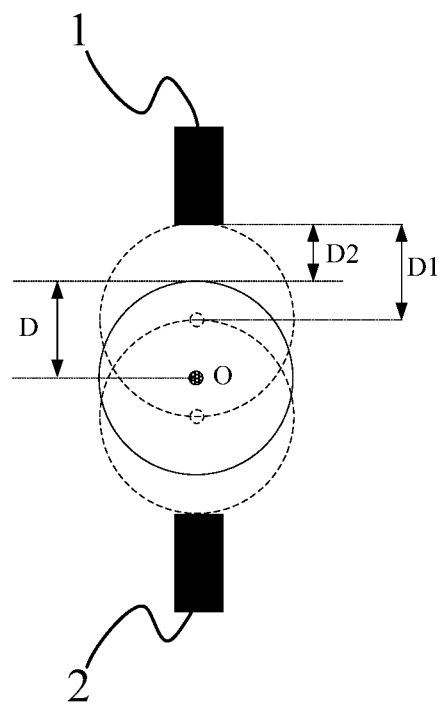
FIG. 4 is a principle diagram of calculating a center position of the rotating shaft according to the fourth embodiment of the present disclosure.

When the rotating shaft 10 stops, the process of measuring the center position of the shaft 10 is shown in FIG. 4: at first, the rotating shaft 10 is moved to the position of the sensor 1 by the magnetic bearing, so that the sensor 1 generates a minimum value of a displacement signal and transmits the minimum value of the displacement signal to the calculating unit of the processor; then, the rotating shaft 10 is moved by the magnetic bearing from the position of the sensor 1 to the position of the sensor 2, so that the sensor 1 generates a maximum value of a displacement signal and transmits the maximum value of the displacement signal to the calculating unit; the calculating unit calculates the center position of the rotating shaft according to the maximum value and the minimum value of the displacement signal.

Further, the calculating unit obtains the maximum value D1 of the distance between the rotating shaft 10 and the sensor 1 according to the maximum value of the displacement signal, and obtains the minimum value D2 of the distance between the rotating shaft 10 and the sensor 2 according to the minimum value of the displacement signal, and then calculates the center position O of the rotating shaft 10 according to the radius D of the rotating shaft 10, the maximum value D1 and the minimum value D2. That is to say, the center position O is equal to the maximum value D1 minus the minimum value D2 and plus the radius D, as shown in FIG. 4.

After calculating the center position of the rotating shaft 10 at each position, the first judging unit plots a curve of the changed center positions according to the calculated value of each center position, and judges whether the rotating shaft 10 is bent or not according to the curve of the changed center positions. If the rotating shaft is not bent, outputs a detection result of qualification of the shaft 10. If the rotating shaft is bent, the first judging unit sends control commands to the second judging unit. After receiving the control commands, the second judging unit compares each value of the center positions and calculates the difference between the maximum value and the minimum values of the center positions, then judges whether the difference is less than the threshold or not; if yes, outputs a detection result of qualification of the rotating shaft 10; if not, outputs a detection result of disqualification of the rotating shaft. If the output result is that the rotating shaft 10 is qualified, it means that the rotating shaft 10 is not bent or the bend degree is within the allowable range. If the output result is that the shaft 10 is unqualified, it means that the bend degree of the shaft 10 is excessive, and the rotating shaft needs to be refinished, so as to avoid destructive effects caused by the rotating shaft 10 on the magnetic bearing system. Wherein, the threshold may be set according to a specific application situation of the rotating shaft, which is not defined in the present invention.

It should be further noted that, the first judging unit may judge whether the rotating shaft 10 is bent or not through judging whether the curve of the changed center positions is a straight line or not. If the curve of the changed center positions is a straight line, then the rotating shaft 10 is not bent. If the curve of the changed center positions is not a straight line, then the rotating shaft 10 is bent, and the first judging unit further judges whether the bend degree the rotating shaft 10 is within the allowable range or not. In addition, the first judging unit may also judge whether the rotating shaft 10 is bent or not through judging whether the curve of the changed center positions is a sine curve or not. If the curve of the changed center positions is a sine curve, then the rotating shaft 10 is bent. If the curve of the changed center positions is not a sine curve, then the rotating shaft 10 is not bent.

The system for detecting bend in the rotating shaft of magnetic bearing provided by the present disclosure, judges whether the rotating shaft is bent and whether the rotating shaft is qualified through calculating the center positions of the rotating shaft stopping at different positions during rotating a circle. If the rotating shaft is qualified, the bend degree of the rotating shaft is within the allowable range, if the rotating shaft is unqualified, the bend degree of the rotating shaft is excessive, which may cause destructive effects on the magnetic bearing system. In this way, users are able to determine whether the rotating shaft needs to be processed or not based on the test result of the rotating shaft, so as to avoid causing destructive effects on the magnetic bearing system due to excessive bend degree of the rotating shaft.

Figure 5:
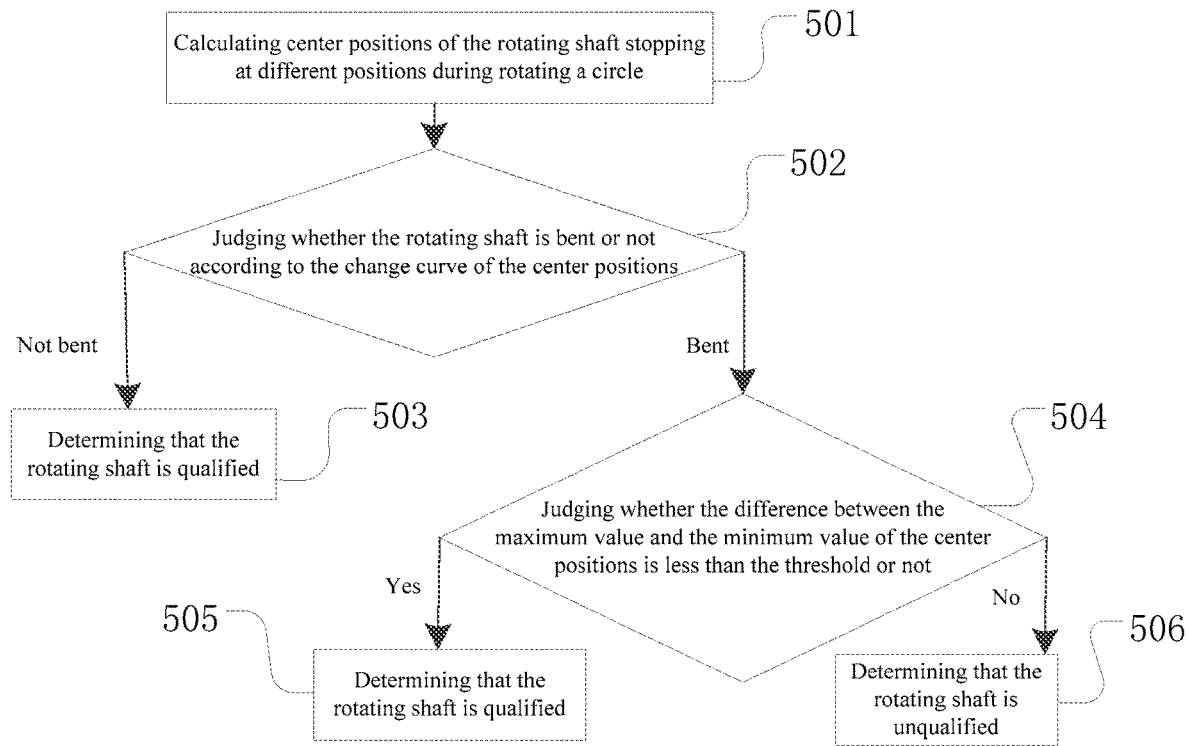
FIG. 5 is a flow chart of a method for detecting bend in the rotating shaft of magnetic bearing according to the fifth embodiment of the present disclosure.

Another embodiment of the present disclosure provides a method for detecting bend in the rotating shaft of magnetic bearing. The detecting method is applied to any one of the embodiments of the systems for detecting bend in the rotating shaft of magnetic bearing. As shown is FIG. 5, the detecting method comprises following steps:

S501: calculating center positions of the rotating shaft stopping at different positions during rotating a circle.

If the rotating shaft is not bent, the center position of the rotating shaft is unique and constant; if the rotating shaft 10 is bent, the center positions will deflect upward or downward. Based on this, in this embodiment, the rotating shaft is judged to be bent or unbent by measuring the center positions of the rotating shaft stopping at different positions.

As shown in FIG. 3, at first, the rotating shaft is controlled to rotate in the direction of the arrow and stop at different positions during rotating a circle. Taking a mark A on the rotating shaft as a reference, when the rotating shaft begins to rotate, the mark A is located at the position indicated by A1; when the rotating shaft stops for the first time, the mark A is located at the position indicated by A2, and so on. Till the mark A returns to the position indicated by A1, the rotation shaft completes rotating a circle.

Figure 6:
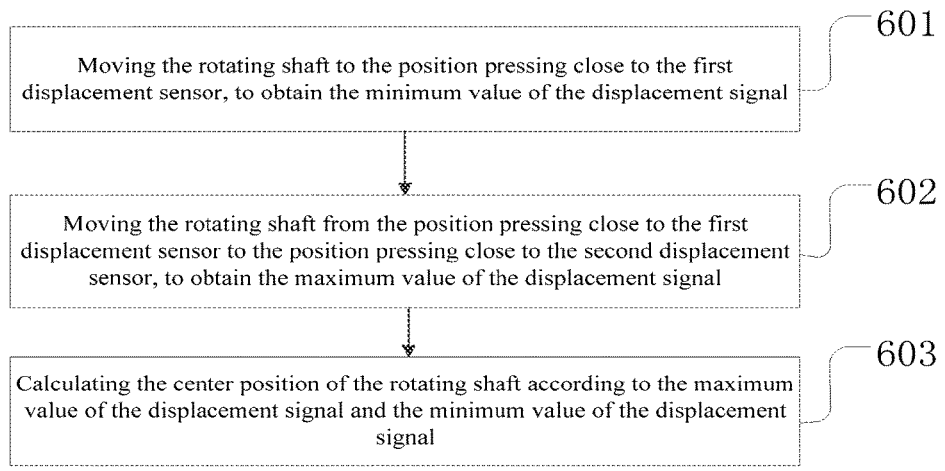
FIG. 6 is a flow chart of calculating a center position of the rotating shaft according to the sixth embodiment of the present disclosure.

As shown in FIG. 6, the process of calculating the center position of the rotating shaft each time the rotating shaft stops comprises following steps:

S601: moving the rotating shaft to the position of the first displacement sensor, to obtain the minimum value of the displacement signal;

S602: moving the rotating shaft from the position of the first displacement sensor to the position of the second displacement sensor, to obtain the maximum value of the displacement signal;

S603: calculating the center position of the rotating shaft according to the maximum value of the displacement signal and the minimum value of the displacement signal.

The process of calculating the center position of the rotating shaft according to the maximum value of the displacement signal and the minimum value of the displacement signal comprises: obtaining the maximum value D1 of the distance between the rotating shaft and the sensor according to the maximum value of the displacement signal; obtaining the minimum value D2 of the distance between the rotating shaft and the sensor according to the minimum value of the displacement signal; then calculating the center position O of the rotating shaft according to the radius D of the rotating shaft, the maximum value D1 and the minimum value D2. That is to say, the center position O is equal to the maximum value D1 minus the minimum value D2 and plus the radius D, as shown in FIG. 4.

S502: judging whether the rotating shaft is bent or not according to the curve of the changed center positions; if the rotating shaft is not bent, then proceed step S503; if the rotating shaft is bent, then jump to step S504;

S503: determining that the rotating shaft is qualified;

S504: judging whether the difference between the maximum value and the minimum value of the center positions is less than the threshold or not, if yes, then proceed step S505; if not, then jump to step S506;

S505: determining that the rotating shaft is qualified;

S506: determining that the rotating shaft is unqualified.

Wherein, the step of judging whether the rotating shaft is bent or not according to the curve of the changed center positions comprises: judging whether the curve is a straight line or not; if yes, then the rotating shaft is not bent; if not, the rotating shaft is bent. Or the step of judging whether the rotating shaft is bent or not according to the curve of the changed center positions comprises: judging whether the curve is a sine curve; if yes, the rotating shaft is bent; if not, the rotating shaft is not bent. The specific calculating process and judging process of the center positions are described in details in the above embodiments and will not be repeated hereafter.

The method for detecting bend in the rotating shaft of magnetic bearing provided by the present disclosure judges whether the rotating shaft is bent and whether the rotating shaft is qualified through calculating the center positions of the rotating shaft stopping at different positions during rotating a circle. If the rotating shaft is qualified, the bend degree of the rotating shaft is within the allowable range, if the rotating shaft is unqualified, the bend degree of the rotating shaft is excessive, which may cause destructive effects on the magnetic bearing system. In this way, users are able to determine whether the rotating shaft needs to be processed or not based on the test result of the rotating shaft, so as to avoid causing destructive effects on the magnetic bearing system due to excessive bend degree of the rotating shaft.

All embodiments in this specification are described in a progressive manner, and the description of each embodiment focuses on the differences from other embodiments, and the same or similar parts of all embodiments can be referred to each other. For the device disclosed in embodiments, since it is corresponding to the method disclosed in embodiments, the description of the device is relatively simple, and the corresponding parts may refer to the description of the method.

The description of the embodiments disclosed above enables those skilled in the art to implement or use the present invention. Various modifications to these embodiments are readily apparent to those skilled in the art, and the general principles defined herein may be applied to other embodiments without departing from the spirit or scope of the invention. Thus, the present invention will not be limited to the embodiments shown herein but will conform to the widest scope consistent with the principles and novel features disclosed herein.

What is claimed is:

1. A system for detecting bending in a rotating shaft of a magnetic bearing, characterized by comprising at least one first displacement sensor disposed on one side of the rotating shaft, at least one second displacement sensor disposed on an opposite side of the rotating shaft, and a processor electrically connected with the first displacement sensor and the second displacement sensor;

the first displacement sensor is configured to measure a relative displacement between the rotating shaft and the first displacement sensor;

the second displacement sensor is configured to measure a relative displacement between the rotating shaft and the second displacement sensor;

the processor comprises a calculating unit, a first judging unit and a second judging unit;

the calculating unit is configured to calculate center positions of the rotating shaft stopping at different positions during rotation of the rotating shaft;

the first judging unit is configured to judge whether the rotating shaft is bent or not according to a curve of changed center positions, output a first test result of qualification if the rotating shaft is not bent, and send an instruction to the second judging unit if the rotating shaft is bent;

the second judging unit is configured to after receiving the instruction, output a second test result of qualification of the rotating shaft if a difference between a maximum value and a minimum value of the center positions is less than a threshold value, and output a test result of disqualification of the rotating shaft if the difference is greater than or equal to the threshold value.

2. The system of claim 1, wherein, when the rotating shaft stops at a position during the rotation of the rotating shaft, the rotating shaft is moved to a position of the first displacement sensor by the magnetic bearing, so that the first displacement sensor generates a minimum value of a displacement signal and transmits the minimum value of the displacement signal to the calculating unit of the processor;
then, the rotating shaft is moved by the magnetic bearing from the position of the first displacement sensor to a position of the second displacement sensor, so that the first displacement sensor generates a maximum value of a displacement signal and transmits the maximum value of the displacement signal to the calculating unit;
the calculating unit calculates the center position of the rotating shaft according to the maximum value and the minimum value of the displacement signal.

3. The system of claim 2, wherein, the first judging unit judges whether the rotating shaft is bent or not through judging whether the curve of the changed center positions is a straight line or not, wherein,
if the curve of the changed center positions is a straight line, then the rotating shaft is not bent; and,
if the curve of the changed center positions is not a straight line, then the rotating shaft is bent.

4. The system of claim 2, wherein, the first judging unit judges whether the rotating shaft is bent or not through judging whether the curve of the changed center positions is a sine curve or not, wherein,
if the curve of the changed center positions is a sine curve, then the rotating shaft is bent; and,
if the curve of the changed center positions is not a sine curve, then the rotating shaft is not bent.

5. The system of claim 1, wherein, the first displacement sensor and the second displacement sensor are eddy current displacement sensors.

6. A method for detecting bending in a rotating shaft of a magnetic bearing, characterized by being applied to the system for detecting bending in the rotating shaft of the magnetic bearing of claim 1;
the method comprising: calculating center positions of the rotating shaft stopping at different positions during rotating a circle;
judging whether the rotating shaft is bent or not according to the curve of the changed center positions; wherein,
if the rotating shaft is not bent, then determining that the rotating shaft is qualified; and
if the rotating shaft is bent, and if the difference between a maximum value and a minimum value of the center positions is less than the threshold, then determining that the rotating shaft is qualified; and
if the rotating shaft is bent, and if the difference between the maximum value and the minimum value of the center positions is greater than or equal to the threshold, then determining that the rotating shaft is unqualified.

7. The method of claim 6, wherein the step of calculating the center positions of the rotating shaft stopping at different positions during rotation of the rotating shaft comprises:
when the rotating shaft stops at a position during the rotation of the rotating shaft, moving the rotating shaft to a position of the first displacement sensor, to obtain the minimum value of the displacement signal;
then, moving the rotating shaft from the position of the first displacement sensor to a position of the second displacement sensor, to obtain the maximum value of the displacement signal; and
calculating the center position of the rotating shaft according to the maximum value of the displacement signal and the minimum value of the displacement signal.

8. The method of claim 6, wherein the step of judging whether the rotating shaft is bent or not according to the curve of the changed center positions comprises:
judging whether the curve is a straight line, wherein,
if the curve is a straight line, then the rotating shaft is not bent; and
if the curve is not a straight line, then the rotating shaft is bent.

9. The method of claim 6, wherein,
the step of judging whether the rotating shaft is bent or not according to the curve of the changed center positions comprises:
judging whether the curve is a sine curve, wherein,
if the curve is a sine curve, then the rotating shaft is bent; and
if the curve is not a sine curve, then the rotating shaft is not bent.

* * * * *